Patented Mar. 17, 1942

2,276,531

UNITED STATES PATENT OFFICE 2,276,531

WATER-DISPERSIBLE VITAMIN COMPOSITION

Ralph Wechsler, Hillside, N. J., and Bernard A. Dombrow, New York, N. Y., assignors to National Oil Products Company, Harrison, N. J., a corporation of New Jersey No Drawing. Application June 18, 1938, Serial No. 214,590

10 Claims. (Cl. 167—81)

The invention relates in general to vitamin-containing compositions and in particular to water dispersible compositions containing vitamins A and D and to correlated improvements in the preparation of such compositions.

Since the discovery of vitamins a few years ago, their value and vital relationship with respect to the well being of mankind and animal life in general has become more apparent with the passage of time. Various difficulties have been experienced in the manufacture and isolation of the vitamins as well as in the mode of effectively administering the same to human beings and various forms of animal life. The present invention is particularly concerned with the latter problem of administering the vitamins to the subject.

Intensive research has been carried on in an attempt to increase the efficiency of and facilitate the administration of the vitamins to living creatures. Originally, the fish liver oils and other vitamin-bearing oils were used directly, but in view of their obnoxious odor and taste, other forms of the vitamins were sought. At the present time, vitamin concentrates derived from various sources are available, but use of such concentrates is highly inefficient due to the wastage involved in direct administration of the same. It has been proposed to dissolve vitamin concentrates such as fish liver oil concentrates, antirachitic activated sterols, etc., in various organic solvents, but the results have been none too encouraging.

The general object of the invention is to obviate the foregoing and other disadvantages.

A specific object of the invention is to provide an improved water-dispersible vitamin-containing composition.

A further object of the invention is to provide a vitamin-containing emulsion of improved stability.

Another object of the invention is to provide an improved vitamin-containing emulsion adapted for internal or external application.

An additional object of the invention is to provide a novel process of producing an emulsifiable vitamin-containing composition.

Other objects of the invention will in part be obvious and will in part appear hereinafter.

According to the invention, the composition comprises a substance rich in vitamins A and/or D and an emulsifier comprising a degraded glyceride and a soap. Such a composition may be produced, according to the invention, by partially saponifying a triglyceride containing vitamins with a strong alkali in the presence of an inert solvent vehicle. The vitamin-containing triglyceride may comprise a fish liver or like oil, or it may comprise an ordinary fatty oil to which a vitamin concentrate has been added. Alternatively, the vitamin A and/or D concentrate may be added subsequent to the partial saponification step.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

The composition of the invention essentially comprises a substance rich in vitamins A and/or D, such as a fish liver oil, concentrate thereof, irradiated ergosterol, etc.; a water-soluble soap of a higher fatty acid; a degraded glyceride of a higher fatty acid and an inert organic solvent vehicle. The term "degraded glyceride" is used generically to connote either the mono or diglycerides of the higher fatty acids or similar acids such as the naphthenic acids as well as mixtures of these glycerides. The composition may be prepared by merely admixing the several constituents, thereby forming a product readily dispersible in an aqueous medium, but it is highly preferred to produce the composition by dispersing and/or dissolving a suitable triglyceride containing vitamins A and/or D in an inert solvent vehicle and adding thereto a strong alkali in an amount sufficient to react with only one or two of the three available ester groups in the triglyceride, thereby forming the desired soap and degraded glycerides in situ. The composition produced in accordance with the latter procedure is superior in many respects to the product obtained by merely admixing the several constituents. This may be attributed to the fact that the degraded glycerides are formed in situ and thereby provide a more intimate blending action between the soap, which is also formed in situ, and the vitamin-rich portion. In any event, however, the degraded glycerides definitely display a marked blending effect between the soap and the vitamin-containing medium.

In preparing the composition according to the preferred method, any suitable substance rich in vitamins A and/or D is added to any suitable triglyceride of a higher fatty acid, more particularly the naturally occurring triglycerides, such for example, as corn oil, olive oil, cottonseed oil, rapeseed oil, peanut oil, teaseed oil, soya bean oil, fish oils, sperm oil, tallow, palm oil, fish liver oils, etc. In those cases where the oil is rich in vitamins, such as palm oil and the fish liver oils such as cod, halibut, tuna, sardine, etc., the addition thereto of vitamin-rich substances may be dispensed with.

While any of the common strong alkalis such as potassium hydroxide, sodium hydroxide, etc., may be employed to partially saponify the triglyceride, it is highly preferred to use potassium hydroxide in view of the superior results obtained thereby. It is necessary to effect saponification of the triglyceride in the presence of an inert solvent vehicle, otherwise the desired formation of the degraded glycerides will not be achieved. Any suitable inert solvent vehicle may be used, such for example, as diethylene glycol, Cellosolve, Carbitol, etc. or mixtures of these or other hydroxy or hydroxy-ether solvents. The expression "solvent vehicle" is employed herein to connote any suitable solvent or mixture of solvents which will function to yield the results described. The temperature at which saponification is caused to take place preferably lies within the range of room temperature up to 45° C. and for best results should not exceed 50° C.

While the invention is particularly concerned with the emulsification of vitamins A and/or D, other vitamins may also be included in the composition, such as vitamins B, C, E and G. Provitamins such as carotene may also be utilized. Likewise, vitamins A and D from any suitable source may be used such as concentrates derived from palm oil and the fish liver oils or from the physically or chemically activated sterols, such as irradiated cholesterol, ergosterol or from similar substances which have been sulfonated or phosphated.

Other substances may be included in the composition of the invention depending upon the use contemplated therefor. Animal, vegetable or mineral oils, fats and waxes, as well as derivatives thereof, are examples of such substances. Moreover, the composition may be used in the vitamin fortification of foods such as milk, cream, soups, syrups, confections and aqueous or water-miscible foods or medicinal preparations in general, including cough syrups, tonics and the like. The composition also finds a decided use in the manufacture of cosmetics, such as hair lotions, shampoos, creams, hand lotions and other therapeutic compositions.

For a fuller understanding of the nature and objects of the invention, reference should be had to the following examples which are given merely to further illustrate the invention and are not to be construed in a limiting sense, all parts given being by weight:

*Example I*

To 45 parts of cod liver oil (4000 A and 200 D U. S. P. units/gram) in 45 parts of Carbitol, there are added 8 parts of KOH (45%). The resultant composition is readily emulsifiable in water by mere stirring and forms an opalescent emulsion.

*Example II*

60 parts of cod liver oil (1000 A and 250 D U. S. P. units/gram) are dispersed in 30 parts of butyl Carbitol and 10 parts of KOH (45%) are stirred in. The resulting product is optically clear and readily disperses in water.

*Example III*

To a mixture of 25 parts of cod liver oil concentrate (280,000 A and 75,000 D U. S. P. units/gram) and 22 parts of corn oil in 45 parts of carbitol, there are added 6 to 8 parts of 45% KOH. The mixture is stirred until a clear neutral oil results and which forms a translucent emulsion in cold water and a clear emulsion or dispersion in water at 40° C.

*Example IV*

The procedure of Example III is followed with the following:

| | Parts |
|---|---|
| Cod liver oil concentrate (280,000 A and 75,000 D U. S. P. units/gram) | 20 |
| Mixed fish liver oils (80,000 A and 10,000 D U. S. P. units/gram) | 22 |
| Diethylene glycol | 48 |
| KOH (45%) | 10 |

This product produces a clear dispersion in water.

*Example V*

An emulsifying base is produced by adding 2.5 parts of 45% KOH to 41.5 parts of cottonseed oil in 6 parts of diethylene glycol. After the reaction is complete, 50 parts of white mineral oil is added.

One to two parts of a vitamin D concentrate in sesame or olive oil (10,000 U. S. P. units/gram) is admixed with one part of the above base to provide a product readily dispersible in water. The mineral oil in the base may be omitted if desired.

*Example VI*

A base may be produced by partially saponifying 82 parts of sesame oil in 12 parts of diethylene glycol with 6 parts of 45% KOH.

1.5 to 3 parts of the above base are admixed with 9 parts of a vitamin D concentrate (20,000 U. S. P. units/gram) in 24 parts of sesame oil to produce a readily dispersible composition.

*Example VII*

The following ingredients may be directly compounded to form the composition of the invention:

| | Parts |
|---|---|
| Soap made from 20 parts of cod liver oil (1500 A and 200 D U. S. P. units/gram) | 28 |
| Diethylene glycol | 45 |
| Glyceryl mono-oleate | 10 |
| Vitamin concentrate (900,000 A and 25,000 D U. S. P. units/gram) | 27 |

A clear liquid results which forms a light emulsion in water.

The composition of the invention may be dispersed in varying quantities of water to produce an emulsion having the desired vitamin concentration and/or viscosity. The vitamin concentration can also be controlled by the amount incorporated in the emulsifiable composition. It has been found that the potency of vitamins A and D is not affected during the preparation of the composition as well as during or after dispersion of the same in an aqueous medium. Whatever taste or odor that may remain in the composition, is effectively masked, as the emulsifiers serve to coat each droplet of the vitamin-containing substances, thereby shielding the same from the tongue. The emulsified composition is also admirably suited for external application as it does not have a sticky or tacky film after drying.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having described our invention, what we claim as new and desire to secure by Letters Patent is:

1. A homogeneous, readily water-dispersible vitamin composition comprising a fatty substance having a fat-soluble vitamin dissolved therein, a degraded glyceride, a water-soluble soap and a glycol derivative solvent vehicle, the degraded glyceride and soap having been formed in situ by the partial saponification of the aforementioned fatty substance.

2. A homogeneous, readily water-dispersible vitamin composition comprising a fatty substance having vitamin A dissolved therein, a degraded glyceride, a water-soluble soap and a glycol derivative solvent vehicle, the degraded glyceride and soap having been formed in situ by the partial saponification of the aforementioned fatty substance.

3. A homogeneous, readily water-dispersible vitamin composition comprising a fatty substance having vitamin D dissolved therein, a degraded glyceride, a water-soluble soap and a glycol derivative solvent vehicle, the degraded glyceride and soap having been formed in situ by the partial saponification of the aforementioned fatty substance.

4. A homogeneous, readily water-dispersible vitamin composition comprising a fatty substance having vitamins A and D dissolved therein, a degraded glyceride, a water-soluble soap and a glycol derivative solvent vehicle, the degraded glyceride and soap having been formed in situ by the partial saponification of the aforementioned fatty substance.

5. A homogeneous, readily water-dispersible vitamin composition comprising a fatty substance having a fat-soluble vitamin dissolved therein, a degraded glyceride, a water-soluble soap and diethylene glycol, the degraded glyceride and soap having been formed in situ by the partial saponification of the aforementioned fatty substance.

6. A homogeneous, readily water-dispersible vitamin composition comprising a fatty substance having vitamin A dissolved therein, a degraded glyceride, a water-soluble soap and diethylene glycol, the degraded glyceride and soap having been formed in situ by the partial saponification of the aforementioned fatty substance.

7. A homogeneous, readily water-dispersible vitamin composition comprising a fatty substance having vitamin D dissolved therein, a degraded glyceride, a water-soluble soap and diethylene glycol, the degraded glyceride and soap having been formed in situ by the partial saponification of the aforementioned fatty substance.

8. A homogeneous, readily water-dispersible vitamin composition comprising a fatty substance having vitamins A and D dissolved therein, a degraded glyceride, a water-soluble soap and diethylene glycol, the degraded glyceride and soap having been formed in situ by the partial saponification of the aforementioned fatty substance.

9. A homogeneous, readily water-dispersible vitamin composition comprising a fish liver oil, a degraded glyceride, a water-soluble soap and a glycol derivative solvent vehicle, the degraded glyceride and soap having been formed in situ by the partial saponification of the fish liver oil.

10. A homogeneous, readily water-dispersible vitamin composition comprising a fish liver oil, a degraded glyceride, a water-soluble soap and diethylene glycol, the degraded glyceride and soap having been formed in situ by the partial saponification of the fish liver oil.

RALPH WECHSLER.
BERNARD A. DOMBROW.